(12) United States Patent
Bristol et al.

(10) Patent No.: US 10,330,887 B2
(45) Date of Patent: Jun. 25, 2019

(54) FLEXIBLE MEMBRANES CONNECTED TO MOVABLE LENSES OF HEAD-MOUNTED DISPLAY SYSTEMS AND RELATED TECHNOLOGY

(71) Applicant: FACEBOOK TECHNOLOGIES, LLC, Menlo Park, CA (US)

(72) Inventors: Peter Wesley Bristol, Seattle, WA (US); Joseph Patrick Sullivan, Issaquah, WA (US); Chun Li Chen, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/253,241

(22) Filed: Aug. 31, 2016

(65) Prior Publication Data
US 2017/0192198 A1    Jul. 6, 2017

Related U.S. Application Data

(60) Provisional application No. 62/273,679, filed on Dec. 31, 2015.

(51) Int. Cl.
*G02B 23/00*    (2006.01)
*G02B 7/12*    (2006.01)
(Continued)

(52) U.S. Cl.
CPC .............. *G02B 7/12* (2013.01); *G02B 7/22* (2013.01); *G02B 27/0176* (2013.01);
(Continued)

(58) Field of Classification Search
CPC ...... G02B 23/16; G02B 27/01; H04N 13/044; H04N 13/0441
(Continued)

(56) References Cited

U.S. PATENT DOCUMENTS 5,486,841 A    1/1996    Hara
6,254,240 B1 *    7/2001    Maciejewski .......... G02B 23/16
                                                    359/402
(Continued)

OTHER PUBLICATIONS

U.S. Appl. No. 14/877,848 by Tempel, M., et al., filed Oct. 7, 2015.
(Continued)

*Primary Examiner* — Audrey Y Chang
(74) *Attorney, Agent, or Firm* — FisherBroyles, LLP (57) ABSTRACT

A head-mounted display in accordance with an embodiment of the present technology includes a display housing and one or more displays within the display housing. The display system further includes a first lens and a second lens, each being operably associated with the one or more displays. A lateral distance between the first and second lenses is adjustable to accommodate users having different interpupillary distances. The display system still further includes a flexible membrane having a region extending between the first and second lenses. The region of the membrane extending between the first and second lenses is configured to resiliently expand as the lateral distance between the first and second lenses increases and to resiliently contract as the lateral distance between the first and second lenses decreases.

20 Claims, 8 Drawing Sheets

(51) Int. Cl.
*G02B 7/22* (2006.01)
*G02B 27/22* (2018.01)
*G02B 27/01* (2006.01)

(52) U.S. Cl.
CPC .. *G02B 27/2228* (2013.01); *G02B 2027/0134* (2013.01); *G02B 2027/0159* (2013.01)

(58) Field of Classification Search
USPC ....... 359/411, 412, 473, 477, 630, 474, 408; 348/53
See application file for complete search history.

(56) References Cited

U.S. PATENT DOCUMENTS

| | | | |
|---|---|---|---|
| 6,704,141 | B1 | 3/2004 | Nowak |
| 8,355,208 | B1 | 1/2013 | Baker |
| 8,605,008 | B1 | 12/2013 | Prest et al. |
| 9,529,194 | B2 * | 12/2016 | Yoo .................... G02B 27/0101 |
| 2005/0243418 | A1 * | 11/2005 | La .......................... G03B 35/18 359/477 |
| 2006/0072206 | A1 | 4/2006 | Tsuyuki |
| 2006/0179554 | A1 | 8/2006 | Barton et al. |
| 2011/0225709 | A1 | 9/2011 | Saylor et al. |
| 2012/0255104 | A1 | 10/2012 | Didier et al. |
| 2013/0083391 | A1 | 4/2013 | Teetzel |
| 2015/0103152 | A1 * | 4/2015 | Qin ...................... H04N 13/044 348/53 |
| 2015/0238361 | A1 | 8/2015 | Orzeck et al. |
| 2016/0158064 | A1 | 6/2016 | Donnadieu et al. |
| 2017/0082859 | A1 | 3/2017 | Drinkwater |
| 2017/0102546 | A1 | 4/2017 | Tempel et al. |
| 2017/0318281 | A1 * | 11/2017 | Edlund ................ H04N 13/044 |

OTHER PUBLICATIONS

U.S. Appl. No. 14/964,199 by Drinkwater, J., et al., filed Dec. 9, 2015.

Non-Final Office action dated Sep. 21, 2017 for U.S. Appl. No. 14/964,199 by Drinkwater, J., et al., filed Dec. 9, 2015.

* cited by examiner

FLEXIBLE MEMBRANES CONNECTED TO MOVABLE LENSES OF HEAD-MOUNTED DISPLAY SYSTEMS AND RELATED TECHNOLOGY

CROSS REFERENCE TO RELATED APPLICATION

This application claims priority to U.S. Provisional Patent Application Ser. No. 62/273,679, filed Dec. 31, 2015, titled "Flexible Membranes Connected to Movable Lenses of Head-Mounted Display Systems and Related Technology," which is incorporated in its entirety by reference thereto.

TECHNICAL FIELD

This disclosure is generally directed to head-mounted display systems, such as head-mounted display systems having internal lenses.

BACKGROUND

Human eyes are separated by an interpupillary distance that causes each eye to have a slightly different view. The human brain can combine the different views from the left and right eye to form a three-dimensional mental image. Disparities between the left-eye view and the right-eye view can provide depth cues that can be used by the brain to perceive depth in the three-dimensional mental image.

A typical head-mounted display system includes a flat display panel and a lens for each of a user's eyes. Separate images having slightly different views are presented to the user's eyes via the corresponding display panels and lenses. When the user views the display panels, the user's brain combines the separate images to form a three-dimensional image. If a distance between the lenses does not adequately correspond to the user's interpupillary distance, however, the user may not accurately perceive depth in the image and/or may perceive two separate images. This can cause user discomfort or an otherwise suboptimal user experience.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical, similar, or analogous components or features of more than one embodiment of the present technology.

DETAILED DESCRIPTION

Head-mounted display systems and related devices, systems, and methods in accordance with embodiments of the present technology can at least partially address one or more problems associated with conventional technologies whether or not such problems are stated herein. For example, head-mounted display systems in accordance with at least some embodiments of the present technology include features that facilitate both adjustability and compartmentalization of internal components without unduly compromising compactness. A head-mounted display system in accordance with a particular embodiment includes lenses that can be moved closer together or farther apart to accommodate users having different interpupillary distances. This adjustment changes the dimensions of various internal areas around the lenses. Rather than leaving these internal areas exposed, the display system can include a flexible membrane that expands and contracts in concert with the changing dimensions of the internal areas. The flexible membrane can shield one or more internal displays of the display system from light, dust, impact, etc. In contrast to conventional display systems, display systems in accordance with embodiments of the present technology can be more durable, easier to maintain, less susceptible to light infiltration, and/or have other advantages.

Specific details of head-mounted display systems and related devices, systems, and methods in accordance with several embodiments of the present technology are described herein with reference to FIGS. 1-8. It should understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology.

The terminology used herein is to be interpreted in its broadest reasonable manner, even though it is being used in conjunction with a detailed description of several specific examples of systems, devices, and methods in accordance with embodiments of the present technology. Unless otherwise specified, the terms "distal," "proximal," and variations thereof are used herein to reference the positions or directions of certain elements and operations of the described devices, systems, and methods relative to a user's face when the user is wearing a corresponding head-mounted display system.

Figure 1:
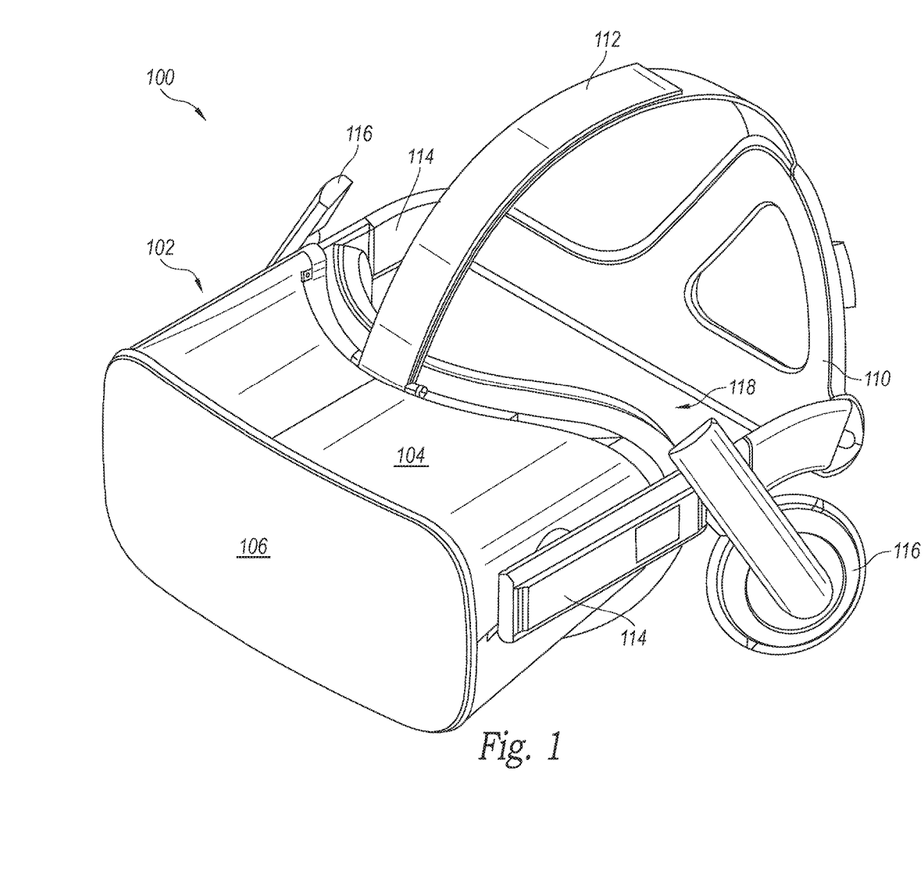
FIG. 1 is an isometric front view of a head-mounted display system in accordance with an embodiment of the present technology.

FIG. 1 is an isometric front view of a head-mounted display system 100 in accordance with an embodiment of the present technology. The display system 100 can include a display portion 102 including a display housing 104 and a front cover 106 at a distal end portion of the display housing 104. The display system 100 can further include a head mount 108 having a rear cradle 110 and an adjustable strap 112 extending between the rear cradle 110 and the display housing 104. The rear cradle 110 and the strap 112 can be at a rear portion and a top portion, respectively, of a user's head when the user is wearing the display system 100. The head mount 108 can further include arms 114 extending between the rear cradle 110 and the display housing 104 at opposite sides of the display housing 104. The display system 100 can still further include earpieces 116 coupled to the arms 114. The display system 100 can also include a mask portion 118 partially inset within the display housing 104 and partially projecting proximally from the display housing 104.

Figure 2:
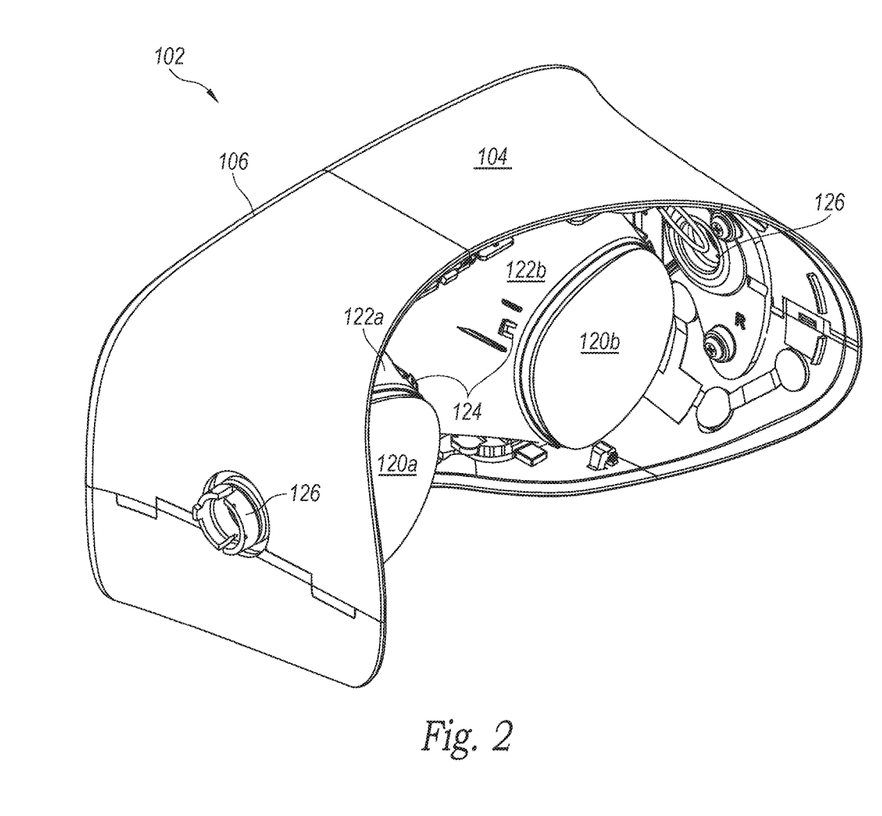
FIG. 2 is an isometric rear view of a display portion of the display system shown in FIG. 1.

FIG. 2 is an isometric rear view of the display portion 102 of the display system 100. As shown in FIG. 2, the display system 100 can include lenses 120 (individually identified as lenses 120a, 120b) within the display housing 104. In the illustrated embodiment, the display system 100 further includes frustoconical displays 122 (individually identified as displays 122a, 122b) operably associated with the lenses 120. In particular, the display 122a is coupled to the lens 120a and the display 122b is coupled to the lens 120b. In other embodiments, a counterpart of display system 100 can include a single display coupled to and operably associated with both of the lenses 120 or having another suitable display configuration. With reference again to FIG. 2, the displays 122a, 122b can include circumferentially spaced-apart wedges 124 projecting outwardly. The display system 100 can include hinges 126 at the opposite sides of the display housing 104. The arms 114 can be rotatably connected to the display housing 104 at the hinges 126.

A lateral distance between the lenses 120 can be adjustable, such as to accommodate users having different inter-pupillary distances. For example, the display system 100 can include a mechanism (not shown) that moves one or both of the lenses 120 in response to a user input. The user input can be movement of a slider (not shown), rotation of a dial (not shown), or another suitable type of input. Examples of suitable mechanisms for changing the lateral distance between the lenses 120 are provided in U.S. patent application Ser. No. 14/877,848, filed Oct. 7, 2015, which is incorporated herein by reference in its entirety. In at least some embodiments, the lateral distance between the lenses 120 is adjustable between a minimum distance and a maximum distance. A difference between the minimum and maximum distances can be within a range from 20 mm to 40 mm or within another suitable range depending on the range of interpupillary distances the display system 100 is configured to accommodate.

Figures 3A, 3B:
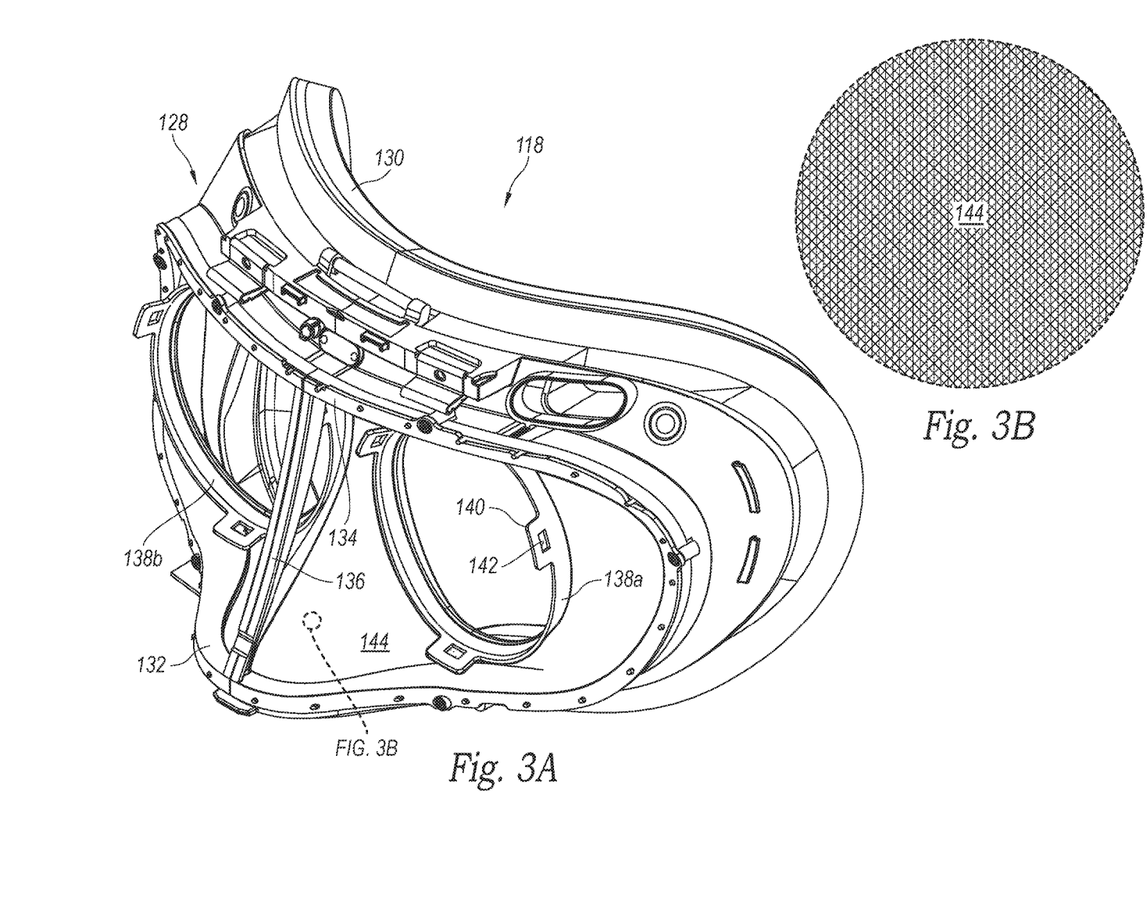
FIG. 3A is an isometric front view of a mask portion of the display system shown in FIG. 1.
FIG. 3B is an enlarged view of a portion of FIG. 3A.

FIG. 3A is an isometric front view of the mask portion 118 of the display system 100. With reference to FIGS. 1-3A together, the display system 100 can include a perimeter frame 128 and a pad 130 extending proximally from the perimeter frame 128. The perimeter frame 128 can be stepped inwardly relative to the pad 130 and can be configured to be received as an inset within a proximal end portion of the display housing 104. When the perimeter frame 128 is fully received within the proximal end portion of the display housing 104, the pad 130 can remain outside the display housing 104. During use of the display system 100, the pad 130 can snugly contact a user's face along an oblong path encircling the user's eyes. The pad 130 and the perimeter frame 128 can curve rearwardly from a vertical center axis to either side. At a central lower portion of the perimeter frame 128, the perimeter frame 128 can include a distally extending protrusion 132 shaped to accommodate a user's nose when the user is wearing the display housing 104. At a central upper portion of the perimeter frame 128, the perimeter frame 128 can include a brow piece 134. The perimeter frame 128 can further include a center brace 136 extending between a distalmost portion of the protrusion 132 and the brow piece 134.

The display system 100 can include lens frames 138 (individually identified as lens frames 138a, 138b) encircled by the perimeter frame 128. When the display portion 102 and the mask portion 118 of the display system 100 are assembled, the lens frames 138 can be coupled to the lenses 120 at perimeter portions of the lenses 120. The lens frames 138a, 138b can include circumferentially distributed tabs 140 projecting distally. The tabs 140 can include respective openings 142 shaped to receive the wedges 124. For example, when the display portion 102 and the mask portion 118 of the display system 100 are assembled, the tabs 140 can slide distally over the wedges 124 until the wedges 124 are received within the openings 142. In this manner, the lens frames 138 can be locked into alignment with the lenses 120. When the lateral distance between the lenses 120 is adjusted, the lens frames 138 can move in concert with the lenses 120 relative to the perimeter frame 128. As shown in FIG. 3A, the display system 100 can include a membrane 144 through which the lens frames 138 are movably connected to the perimeter frame 128.

FIG. 3B is an enlarged view of a portion of FIG. 3A. As shown in FIG. 3B, in the illustrated embodiment, the membrane 144 is made at least primarily of fabric. Suitable fabrics include woven and non-woven compositions of synthetic fibers (e.g., nylon, rayon, spandex, etc.) and/or natural fibers (e.g., cotton, wool, etc.). In other embodiments, the membrane 144 can be made at least primarily of a non-fabric material. Suitable non-fabric materials include thin-films (e.g., extruded and/or calendered films) of one or more polymeric materials (e.g., rubber, polyamides, polyurethanes, etc.). Many suitable fabric and non-fabric materials for the membrane 144 are polymeric materials. Thus, in at least some cases, the membrane 144 is made at least primarily of polymeric material. In these and other cases, the membrane 144 can be opaque, such as to reduce infiltration of light into the an internal area of the display housing 104 containing the displays 122. For example, the fabric of the membrane 144 can be tightly woven such that little or no light passes through interstices between fibers of the fabric even when the fabric is stretched.

Figure 4:
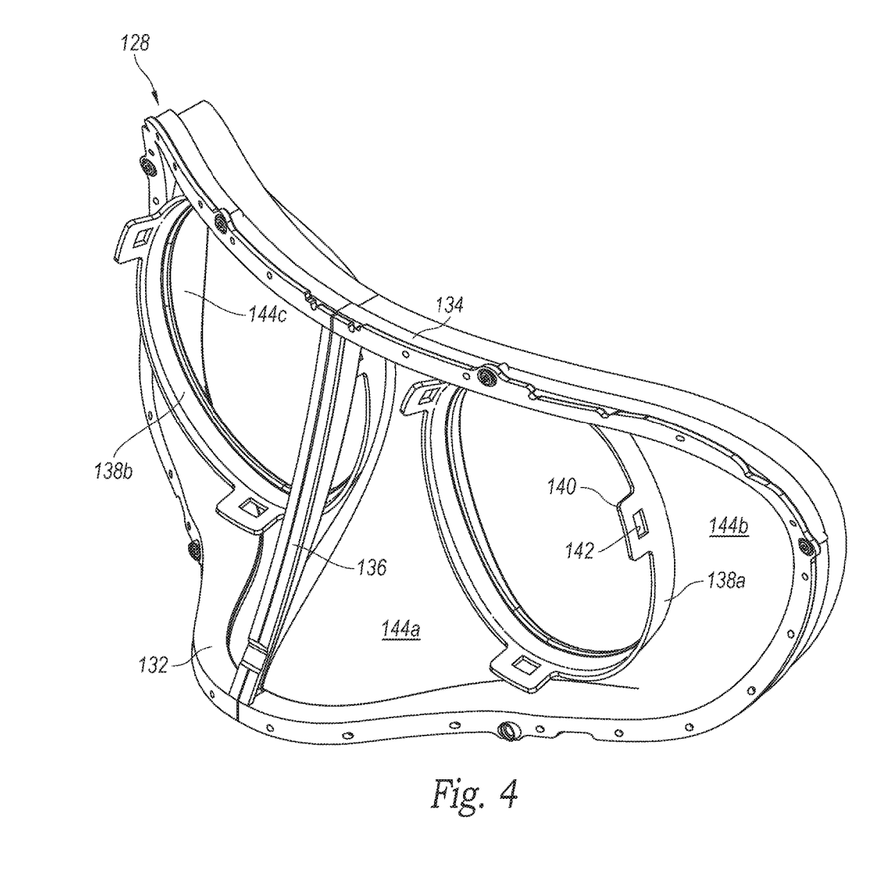
FIGS. 4 and 5 are, respectively, an isometric front view and a front profile view of a membrane and associated components of the display system shown in FIG. 1.
Figure 5:
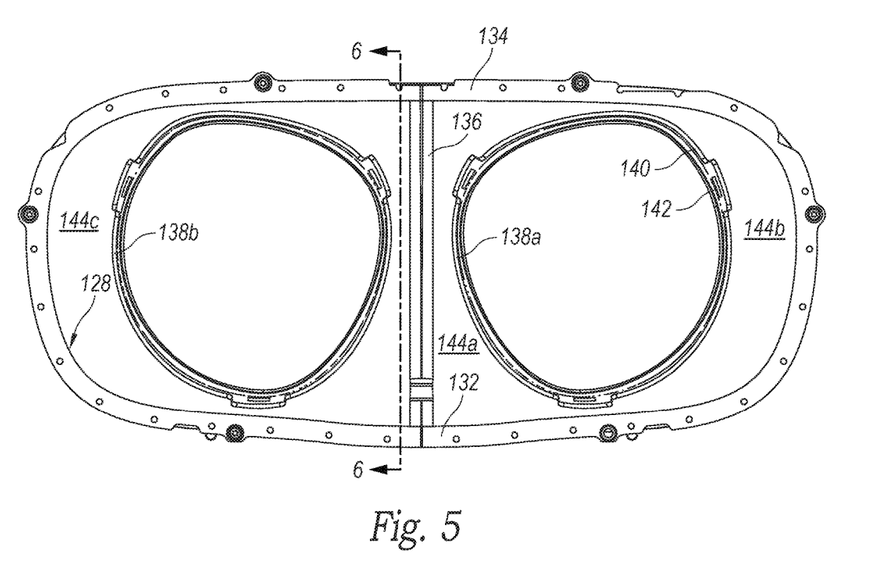

FIGS. 4 and 5 are, respectively, an isometric front view and a front profile view of the membrane 144 and associated components of the display system 100. With reference to FIGS. 1-5 together, the membrane 144 can both encircle and extend between the lenses 120. For example, the membrane 144 can include a first region 144a extending between the lenses 120 and between the lens frames 138; a second region 144b extending between one side of the perimeter frame 128 and both the lens 120a and the lens frame 138a; and a third region 144c extending between an opposite side of the perimeter frame 128 and both the lens 120b and the lens frame 138b. Due to the curvature of the mask portion 118 of the display system 100, the second and third regions 144b, 144c of the membrane 144 can extend distally from the corresponding sides of the perimeter frame 128 toward the corresponding lens frames 138.

The membrane 144 can be flexible. For example, the first region 144a of the membrane 144 can be configured to resiliently expand as the lateral distance between the lenses 120 and between the lens frames 138 increases and to resiliently contract as the lateral distance between the lenses 120 and between the lens frames 138 decreases. Similarly, the second and third regions 144b, 144c of the membrane 144 can be configured to resiliently contract as the lateral distance between the lenses 120 and between the lens frames 138 increases and to resiliently expand as the lateral distance between the lenses 120 and between the lens frames 138 decreases.

The first region 144a of the membrane 144 can curve distally outward toward the protrusion 132. This and/or other three-dimensionality can be pre-shaped into the membrane 144. For example, the membrane 144 can be sewn, molded, or otherwise pre-manufactured to have some or all of its final shape. Alternatively, the membrane 144 can be flat before installation in the display system 100 and can stretch to achieve its final shape when fastened to other components of the display system 100. For example, the first region 144a of the membrane 144 can be fastened to the center brace 136 to cause the membrane 144 to have a desired curvature for accommodating the bridge of a user's nose when the user is wearing the display system 100. In the illustrated embodiment, the membrane 144 is continuous throughout the area around and between the lenses 120 and lens frames 138. In other embodiments, the membrane 144 can include one or more discontinuities. For example, a counterpart of the membrane 144 can include a discontinuity at the center brace 136 that divides a counterpart of the first region 144a of the membrane 144 into two sections.

Figure 6:
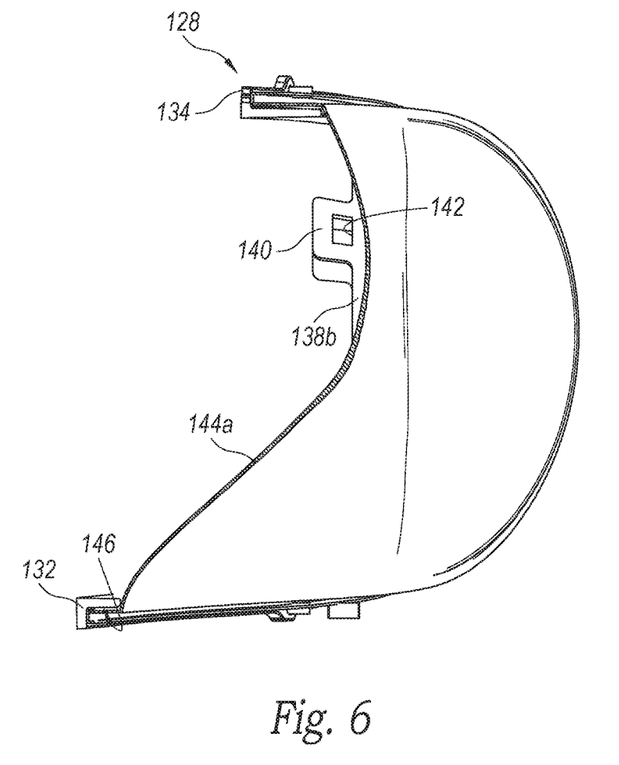
FIG. 6 is a cross-sectional profile view taken along the line 6-6 in FIG. 5.

FIG. 6 is a cross-sectional profile view taken along the line 6-6 in FIG. 5. As shown in FIG. 6, the perimeter frame 128 can include a channel 146 at which an outer portion of the membrane 144 is fastened. For example, the membrane 144 can include holes (not shown) at its outer portion, and can be mechanically fastened (e.g., sewn) to the perimeter frame 128 via the holes and via corresponding features (e.g., corresponding holes, pegs, etc.; not shown) of the perimeter frame 128 at the channel 146. In the illustrated embodiment, the membrane 144 is mechanically fastened to the perimeter frame 128 and adhesively fastened (e.g., with hot-melt adhesive) to the lens frames 138. In other embodiments, the membrane 144 can be fastened to the perimeter frame 128 in another suitable manner and/or fastened to the lens frames 138 in another suitable manner.

With reference to FIGS. 4-6 together, the membrane 144 can be configured to accommodate changes in the lateral distance between the lenses 120 and between the lens frames 138 with little or no aesthetic or functional disruption. For example, the membrane 144 can be at least substantially wrinkle-free and/or taut both when the lateral distance between the lenses 120 and between the lens frames 138 is at its minimum and when the lateral distance between the lenses 120 and between the lens frames 138 is at its maximum. As shown in FIG. 6, different portions of the channel 146 can have different depths. For example, the channel 146 can be deeper at regions of the perimeter frame 128 closer to the lens frames 138 than at regions of the perimeter frame 128 farther from the lens frames 138. Excess portions of the membrane 144 can be loosely disposed within the relatively deep portions of the channel 146. These excess portions of the membrane 144 can mitigate bottlenecking of the deformation potential of the membrane 144 at portions of the membrane 144 spanning relatively small gaps between the perimeter frame 128 and the lens frames 138.

Figure 7:
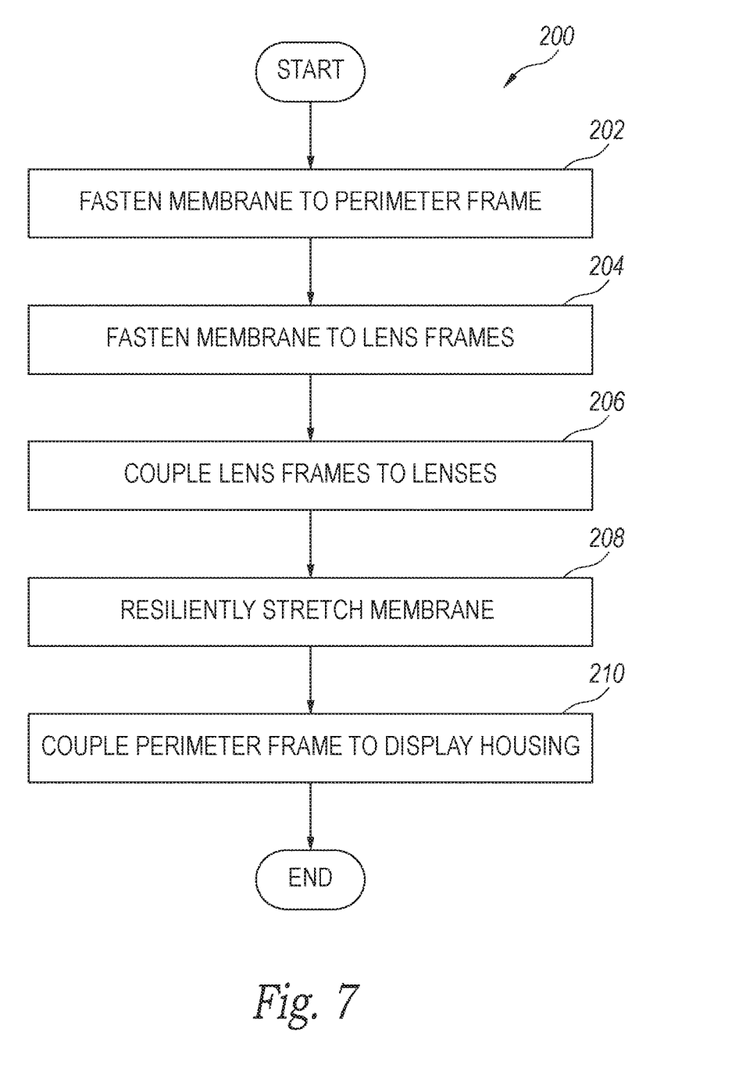
FIG. 7 is a block diagram illustrating a method for making the display system shown in FIG. 1 in accordance with an embodiment of the present technology.

FIG. 7 is a block diagram illustrating a method 200 for making the display system 100 in accordance with an embodiment of the present technology. With reference to FIGS. 1-7 together, the method 200 can include fastening (e.g., mechanically fastening) an outer portion of the membrane 144 to the perimeter frame 128 (block 202). The method 200 can further include fastening (e.g., adhesively fastening) inner portions of the membrane 144 to the lens frames 138 (block 204). In at least some cases, the inner portions of the membrane 144 extend around holes in the membrane 144 corresponding to the locations of the lens frames 138. Next, the method 200 can include coupling the lens frames 138 to the lenses 120, such as via the wedges 124 and the tabs 140 (block 206). The lenses 120 can be positioned in operable associated with the displays 122 before coupling the lens frames 138 to the lenses 120.

In conjunction with fastening the inner portions of the membrane 144 to the lens frames 138, the method 200 can include resiliently stretching the membrane 144 (block 208). For example, the method 200 can include resiliently stretching the first region 144a of the membrane 144 between the lens frames 138, resiliently stretching the second region 144b of the membrane 144 between the lens frame 138a and the perimeter frame 128, and resiliently stretching the third region 144c of the membrane 144 between the lens frame 138b and the perimeter frame 128. The method 200 can further include positioning the perimeter frame 128 at the proximal end portion of the display housing 104 and coupling the perimeter frame 128 to the display housing 104 (block 210).

Figure 8:
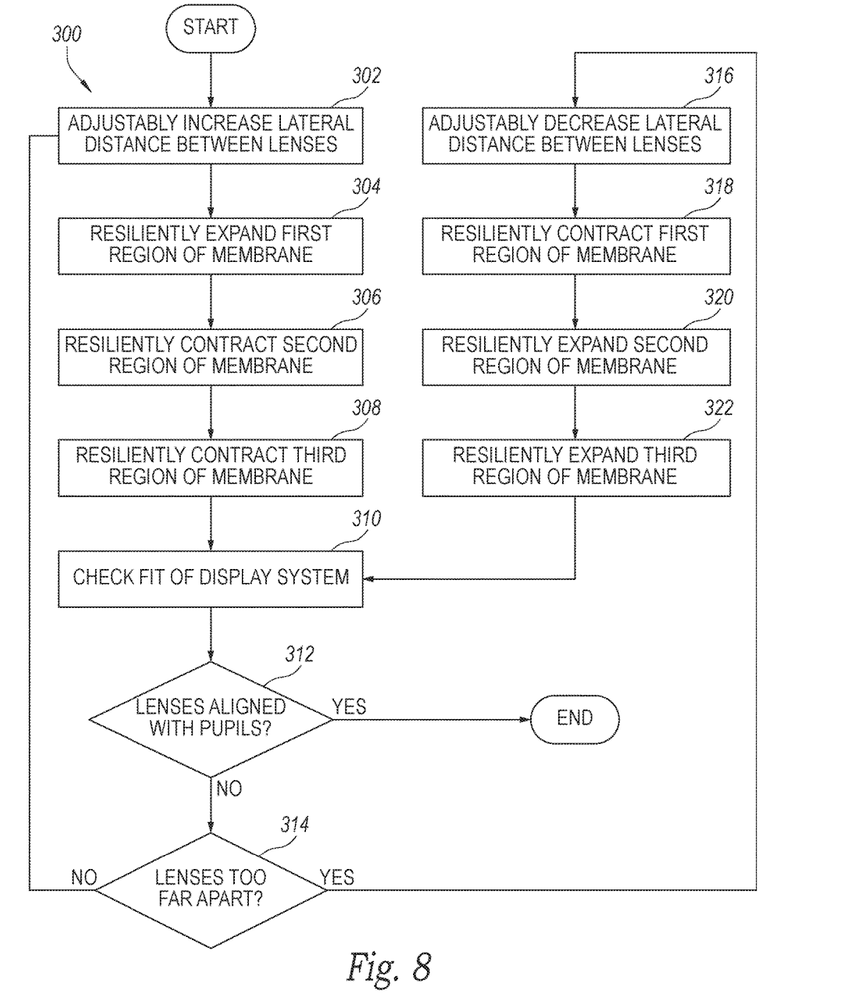
FIG. 8 is a block diagram illustrating a method for adjusting the display system shown in FIG. 1 in accordance with an embodiment of the present technology.

FIG. 8 is a block diagram illustrating a method 300 for using (e.g., adjusting) the display system 100 in accordance with an embodiment of the present technology. With reference to FIGS. 1-6 and 8 together, the method 300 can include adjustably increasing the lateral distance between the lenses 120 (block 302). While adjustably increasing the lateral distance between the lenses 120, the method 300 can include resiliently expanding the first region 144a of the membrane 144 (block 304) and resiliently contracting the second and third regions 144b, 144c of the membrane 144 (blocks 306, 308). Next, the method 300 can include checking the fit of the display system 100 (block 310) and determining if the lenses 120 are aligned with a user's pupils (block 312). If the lenses 120 are aligned with the user's pupils, the method 300 can end. If the lenses 120 are not aligned with the user's pupils, the method 300 can include determining if the lenses 120 are too far apart (block 314). If the lenses 120 are not too far apart, the method 300 can return to block 302. If the lenses 120 are too far apart, the method 300 can include adjustably decreasing the lateral distance between the lenses 120 (block 316). While adjustably decreasing the lateral distance between the lenses 120, the method 300 can include resiliently contracting the first region 144a of the membrane 144 (block 318) and resiliently expanding the second and third regions 144b, 144c of the membrane 144 (blocks 320, 322). Next, the method 300 can include returning to block 310.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A head-mounted display system, comprising:
a display housing;
one or more displays within the display housing;
a first lens and a second lens operably associated with the one or more displays, wherein a lateral distance between the first and second lenses is adjustable such that an adjustment of the lateral distance changes dimensions of internal areas around the first lens and second lens;
a perimeter frame coupled to a proximal perimeter portion of the display housing; and
a flexible membrane having a region extending between the first and second lenses, wherein:
the region of the membrane is configured to resiliently expand as the lateral distance between the first and second lenses increases and to resiliently contract as the lateral distance between the first and second lenses decreases, rather than leaving the internal areas around the first lens and second lens exposed, such that the flexible membrane shields the one or more displays of the display housing from at least one of light, dust, and impact;
the flexible membrane is configured to cover a user's nose when the user is wearing the display system;
the flexible membrane is made at least primarily of fabric or polymeric material;
the region of the membrane is a first region of the membrane;
the membrane has a second region extending between the first lens and the perimeter frame; and
the second region of the membrane is configured to resiliently contract as the lateral distance between the first and second lenses increases and to resiliently expand as the lateral distance between the first and second lenses decreases.

2. The display system of claim 1 wherein the first region of the membrane is opaque.

3. The display system of claim 1 wherein the first region of the membrane is made at least primarily of fabric.

4. The display system of claim 1 wherein the first region of the membrane is made at least primarily of polymeric material.

5. The display system of claim 1 wherein the membrane is molded.

6. The display system of claim 1 wherein the membrane is continuous and encircles the first and second lenses individually.

7. The display system of claim 1 wherein:
the perimeter frame includes a distally extending protrusion shaped to accommodate the user's nose when the display system is fitted on the user; and
the first region of the membrane curves distally outward toward the protrusion.

8. The display system of claim 1 wherein:
the lateral distance between the first and second lenses is adjustable between a minimum distance and a maximum distance; and
the first region of the membrane is at least substantially wrinkle-free both when the lateral distance between the first and second lenses is the minimum distance and when the lateral distance between the first and second lenses is the maximum distance.

9. The display system of claim 8 wherein a difference between the minimum and maximum distances is within a range from 20 mm to 40 mm.

10. The display system of claim 1 wherein:
the lateral distance between the first and second lenses is adjustable between a minimum distance and a maximum distance.

11. The display system of claim 10 wherein a difference between the minimum and maximum distances is within a range from 20 mm to 40 mm.

12. The display system of claim 10, wherein the first region of the membrane is taut both when the lateral distance between the first and second lenses is the minimum distance and when the lateral distance between the first and second lenses is the maximum distance.

13. The display system of claim 1 wherein:
the membrane has a third region extending between the second lens and the perimeter frame; and
the third region of the membrane is configured to resiliently contract as the lateral distance between the first and second lenses increases and to resiliently expand as the lateral distance between the first and second lenses decreases.

14. The display system of claim 13 wherein the display system further comprises:
a first lens frame at a peripheral portion of the first lens, and a second lens frame at a peripheral portion of the second lens;
the second region of the membrane extends distally from the perimeter frame toward the first lens frame; and
the third region of the membrane extends distally from the perimeter frame toward the second lens frame.

15. The display system of claim 14 wherein:
the membrane is mechanically fastened to the perimeter frame; and
the membrane is adhesively fastened to the first and second lens frames.

16. A method for making a head-mounted display system, the method comprising:

fastening an outer portion of a flexible membrane to a perimeter frame, the flexible membrane having a region extending between a first lens and a second lens;

fastening a first inner portion of the membrane to a first lens frame for the first lens, wherein the first inner portion of the membrane extends around a first opening in the membrane;

fastening a second inner portion of the membrane to a second lens frame for the second lens, wherein the second inner portion of the membrane extends around a second opening in the membrane;

coupling the first and second lens frames to the first lens and the second lens, respectively;

positioning the perimeter frame at a proximal end portion of a display housing; and positioning the first and second lenses in operable association with one or more displays within the display housing, wherein:

a lateral distance between the first and second lenses of the head-mounted display system is adjustable such that an adjustment of the lateral distance changes dimensions of internal areas around the first and second lenses;

the region of the membrane is configured to resiliently expand as the lateral distance between the first and second lenses increases and to resiliently contract as the lateral distance between the first and second lenses decreases, rather than leaving the internal areas around the first lens and second lens exposed, such that the flexible membrane shields the one or more displays of the display housing from at least one of light, dust, and impact;

the flexible membrane is configured to cover a user's nose when the user is wearing the display system;

the flexible membrane is made at least primarily of fabric or polymeric material;

the region of the membrane is a first region of the membrane;

the membrane has a second region extending between the first lens and the perimeter frame; and the second region of the membrane is configured to resiliently contract as the lateral distance between the first and second lenses increases and to resiliently expand as the lateral distance between the first and second lenses decreases.

17. The method of claim 16, further comprising:

resiliently stretching the first region of the membrane between the first lens frame and the second lens frame;

resiliently stretching the second region of the membrane between the first lens frame and the perimeter frame; and resiliently stretching a third region of the membrane between the second lens frame and the perimeter frame.

18. The method of claim 16 wherein:

fastening the outer portion of the membrane to the perimeter frame includes mechanically fastening the outer portion of the membrane to the perimeter frame; and fastening the first and second inner portions of the membrane to the first and second lens frames, respectively, includes adhesively fastening the first and second inner portions of the membrane to the first and second lens frames, respectively.

19. The method of claim 16 wherein the first region of the membrane is opaque.

20. The method of claim 16 wherein the first region of the membrane is made at least primarily of fabric.

\* \* \* \* \*